(12) United States Patent
Huber et al.

(10) Patent No.: US 11,543,317 B2
(45) Date of Patent: Jan. 3, 2023

(54) CHANNEL STRUCTURES FOR OPTIMIZING THE MEMBRANE FUNCTION OF OIL-FILLED PRESSURE SENSORS

(71) Applicant: VEGA GRIESHABER KG, Wolfach (DE)

(72) Inventors: Jochen Huber, Wolfach (DE); Julian Epting, Hornberg (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 17/352,561

(22) Filed: Jun. 21, 2021

(65) Prior Publication Data
US 2022/0011187 A1    Jan. 13, 2022

(30) Foreign Application Priority Data
Jul. 10, 2020   (DE) .................... 10 2020 118 313.5

(51) Int. Cl.
*G01L 9/00* (2006.01)
(52) U.S. Cl.
CPC ................. *G01L 9/0048* (2013.01)
(58) Field of Classification Search
None
See application file for complete search history.

(56) References Cited

U.S. PATENT DOCUMENTS

| 9,733,142 | B2 * | 8/2017 | Ishikawa | G01L 9/0054 |
| 2002/0026836 | A1 * | 3/2002 | Hegner | G01L 9/0075 73/717 |
| 2002/0040604 | A1 * | 4/2002 | Hegner | G01L 9/0075 73/715 |
| 2009/0158853 | A1 * | 6/2009 | Berner | G01L 19/147 356/480 |
| 2015/0122040 | A1 * | 5/2015 | Drewes | G01L 9/0072 73/724 |
| 2017/0038270 | A1 * | 2/2017 | Drewes | G01L 19/14 |

FOREIGN PATENT DOCUMENTS

| DE | 102007056844 A1 | 11/2007 |
| DE | 102014106703 A1 | 5/2014 |
| EP | 1334343 B1 | 11/2001 |
| EP | 3767266 A1 | 7/2019 |

OTHER PUBLICATIONS

GPTO office action for related German application 10 2020 118 313.5 dated Mar. 11, 2020.

* cited by examiner

*Primary Examiner* — Lisa M Caputo
*Assistant Examiner* — Nigel H Plumb
(74) *Attorney, Agent, or Firm* — William Gray Mitchell

(57) ABSTRACT

A metallic pressure measuring cell having a base body, a metallic membrane situated and a pressure sensor situated in a sensor chamber of the base body, wherein the pressure on the membrane is transmitted to the pressure sensor by a connecting channel formed between a membrane chamber and a sensor chamber, wherein the chambers and connecting channel are filled with a pressure transmitting medium.

17 Claims, 3 Drawing Sheets

Figure 1:
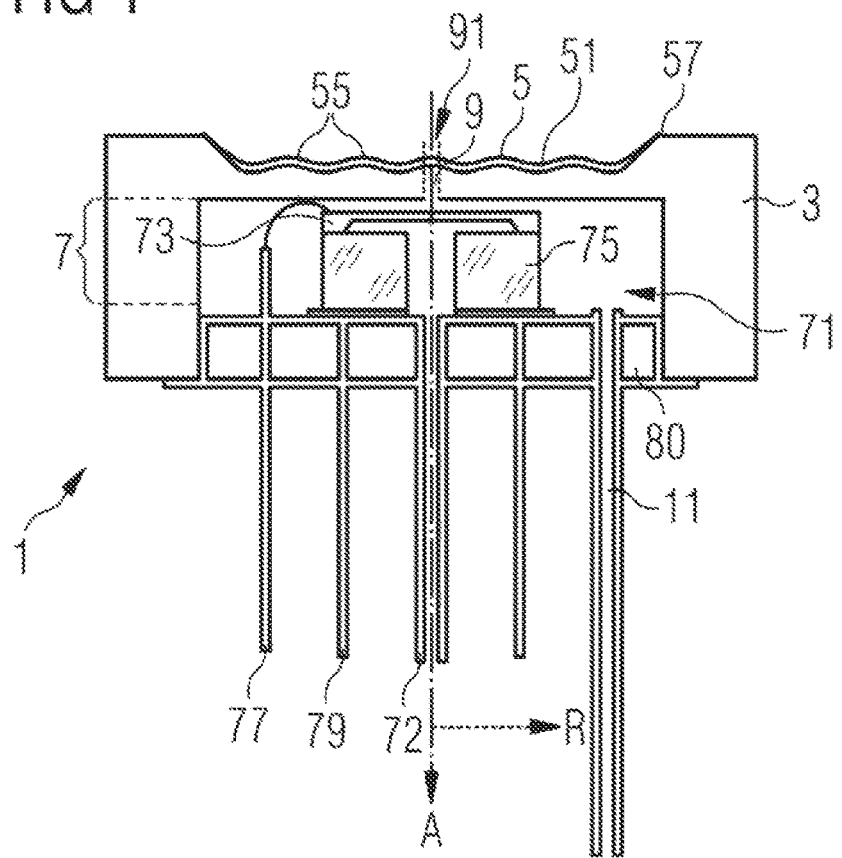

A.

B.

CHANNEL STRUCTURES FOR OPTIMIZING THE MEMBRANE FUNCTION OF OIL-FILLED PRESSURE SENSORS

The present invention relates to a metallic pressure measuring cell according to the generic term of claim 1, as well as to a method for manufacturing a metallic pressure measuring cell with the features of claim 12.

Various forms of pressure measuring cells are known from the prior art. Such pressure measuring cells are used in pressure gauges and convert a pressure into an electrical signal which can then be further processed. Pressure measuring cells are differentiated according to the underlying measuring principle, the materials involved in the process, and whether absolute or relative pressures can be measured.

According to the foregoing, there are, for example, capacitive pressure measuring cells that detect a change in pressure caused by the deformation of a membrane and a resulting change in capacity, resistive and piezoresistive pressure measuring cells in which deformation of a membrane is detected by means of strain gauges, for example, and the pressure is inferred from a change in resistance of the strain gauges, and piezoelectric pressure measuring cells that exploit the piezoelectric effect to determine pressure.

The differentiation according to the materials involved in the process, i.e. the materials that come into contact with the process environment and the process media, generally makes a distinction between metallic and ceramic pressure measuring cells, wherein one comprises a metallic membrane and the other a ceramic membrane. For manufacturing and metrological reasons, a base body of the pressure measuring cell is often made of the same material as the membrane. In terms of manufacturing technology, it is often easier to make a bond between the same or similar materials than between different materials. From a metrological point of view, it is advantageous to use materials with similar or ideally identical thermal expansion coefficients, which is also easier to achieve with the same or similar materials.

Whether absolute or relative pressures can be measured usually depends on whether a second pressure, e.g. an external pressure, is supplied to the backside of the membrane or whether the backside of the membrane is evacuated.

The present application assumes a metallic pressure measuring cell with a metallic base body, a metallic membrane arranged on the base body. A membrane chamber is formed between the membrane and the base body, which is connected to a sensor chamber in which a pressure sensor is arranged via a connecting channel. The chambers and the connecting channel are filled with a pressure transmitting medium.

The actual pressure sensor is usually made of a silicon chip. This chip consists of a membrane structured with piezoresistive resistors that bulges under pressure. The piezo chip is very sensitive to external influences and must therefore be hermetically encapsulated in most cases. It is therefore installed in a pressure-tight manner in a stainless steel housing, which is sealed at the front with a thin stainless steel membrane, thus forming the membrane chamber and the sensor chamber.

The chambers are filled with the pressure transmitting medium, typically a synthetic oil. In such a sensor, only the metallic membrane, in this case made of stainless steel, is in contact with the process, and the process pressure is transmitted to the chip membrane via the oil.

In order to keep temperature influences on the pressure measurement as low as possible, it is necessary to keep a volume located in the chambers and especially the volume of the membrane chamber as low as possible. It is also necessary that the metallic membrane is easily deflectable in the axial direction, but comparatively stiff in the radial direction.

In the prior art, this is achieved by the membrane comprising, in a cross-section view, a corrugated contour that favors deformation in the axial direction, i.e. in the direction in which the compressive force acts on the membrane, and is thus as stiff as possible in the radial direction. In order to keep the volume of the chamber as low as possible, a surface of the base body facing the membrane has a contour adapted thereto. From a manufacturing point of view, it is advantageous if the part of the base body facing the membrane is shaped accordingly and the membrane, only when it is attached to the base body, is molded from this shape of the base body. Specifically, the membrane is situated on the base body, e.g. welded to it, and then pressed onto and molded from the base body. This can be done, for example, by means of a stamp or by applying overpressure.

In this impression, not only the waveform of the surface of the base body facing the membrane is molded, but also the part where the connecting channel between the membrane chamber and the sensor chamber opens into the membrane chamber. This molding of the outlet of the connecting channel can result in the membrane being molded into the connecting channel such that the channel is closed by the membrane. The membrane virtually forms a plug, which closes the outlet of the connecting channel and thus makes it difficult or impossible to subsequently fill the chambers with the pressure transmitting medium.

In the prior art, the membrane is pulled back out of the outlet of the connecting channel by applying a vacuum or is given the desired contour before being connected to the base body.

By applying a vacuum, however, the membrane is deformed again in the opposite direction, so that minimizing the volume of the membrane chamber is not optimal. If the membrane is formed before it is joined to the base body, deviations can occur in both the shaping and the alignment of the membrane in relation to the base body, so that minimizing the volume of the membrane chamber is not optimal with this approach either.

The task of the present invention is to disclose a metallic pressure measuring cell as well as a method for manufacturing such a pressure measuring cell, wherein the drawbacks of the prior art are avoided.

This task is solved by a metallic pressure measuring cell with the features of claim 1 as well as a method for manufacturing a metallic pressure measuring cell with the features of claim 12.

Advantageous further developments are the subject matter of dependent claims.

An inventive metallic pressure measuring cell having a base body, a metallic membrane situated on the base body, wherein a membrane chamber is formed between the membrane and the base body, a pressure sensor situated in a sensor chamber of the base body, wherein a connecting channel is formed between the membrane chamber and the sensor chamber and the chambers are filled with a pressure transmitting medium for transmitting a pressure acting on the membrane, is characterized in that the membrane comprises a surface structure, which, in a plan view, at least overlaps an outer contour of an inlet area of the connecting channel into the membrane chamber.

A surface structure within the meaning of the present application is a roughness exceeding the natural surface roughness of the material of the membrane or an additional structure introduced into the membrane by recesses or elevations. More specifically, these are surface structures that are introduced into the membrane before it is connected to the base body.

In this way, a surface of the membrane is created that prevents sealing of an inlet opening of the connecting channel into the membrane chamber. The surface structure ensures that at least an initial quantity of pressure transmitting medium always enters the membrane chamber and that the membrane is lifted and filled by the pressure of the pressure transmitting medium during filling.

Information on direction is defined in the present application as follows:

The membrane defines a membrane plane spanned by a circumferential connection of the membrane to the base body. Starting from this membrane plane, an axial direction is defined by a surface standard on the membrane plane. The radial direction extends from a center point of the membrane, in a plan view of the membrane plane. In plan view means looking at the membrane of the measuring cell in axial direction. A cross section is to be understood as a section with a plane spanned by the axial direction and the radial direction.

The membrane preferably has a circular outer contour in plan view.

In a preferred embodiment, the membrane can comprise at least one channel, that, in a plan view, intersects at least once the outer contour of the inlet area of the connecting channel into the membrane chamber. Such a channel, by its design as a recess opposite the membrane surface, ensures that pressure transmitting medium enters and fills the membrane chamber even when the membrane is deformed into the connecting channel. Channels can be introduced into the membrane particularly easily and thus represent a cost-effective variant for a surface structure according to the invention.

In order to minimize the volume of the membrane chamber, it is useful if the membrane comprises a surface contour corresponding to a wall of the base body directly opposite to the membrane in a section perpendicular to a membrane plane. Such a corresponding surface structure can be achieved by directly molding a surface shape of the base body.

Said molding can be performed, for example, by applying an overpressure to the membrane, e.g. by a gas or liquid, and thus pressing it against the surface of the base body that faces it. Due to the thinness of the membrane, it thus undergoes a plastic deformation and adopts the surface contour of the base body.

As an added benefit, the surface contour is undulating for this purpose. A undulating contour allows flexibility of the membrane in axial direction and rigidity of the membrane in radial direction. It is advantageous if the surface contour comprises a cosine-shaped profile in a cross-sectional view starting from a center point of the membrane. This means that the contour comprises a wave crest at the center point, which counteracts the sealing of the connecting channel, which usually opens centrally into the membrane chamber.

In plan view of the membrane, the at least one channel is preferably designed to run in the radial direction at least in sections. In one embodiment, the at least one channel extends completely in the radial direction.

In one variant, the at least one channel can be spiral-shaped at least in sections in plan view of the membrane. Such a spiral design has the advantage of overlapping a undulating contour of the membrane, making it less conspicuous than channels running in the radial direction.

To ensure that the membrane chamber is filled safely, it is advantageous if the at least one channel, measured from a center point of the membrane in plan view, is formed to at least ¼, or more specifically at least ⅓ of a radius of the membrane. It should be noted that only the measurement of the extension of the channel is made starting from the center of the membrane. The channel itself does not necessarily have to start at the center of the membrane. In particular, if multiple channels are provided, it is even advantageous if these are not formed starting at the center of the membrane, since the membrane could otherwise be weakened at this point due to the repeated processing.

It may be advantageous if the membrane comprises at least 2, preferably at least 3, 4, 6 or 8 channels. A plurality of channels can serve to ensure that the membrane chamber is not sealed as a result of the molding of the surface contour of the base body in the inlet area of the connecting channel.

Overall, in the scenario of a plurality of channels, it is advantageous if the channels do not cross to prevent the membrane from weakening.

Additionally or alternatively, it is advantageous if the surface of the membrane facing the base body is roughened at least in sections. In particular, it is advantageous if the surface of the membrane facing the base body is roughened in an area overlapping the outer contour of the inlet area of the connecting channel into the membrane chamber.

The pressure sensor can be configured as a piezo sensor, in particular a piezoelectric or piezoresistive pressure sensor.

The connecting channel preferably opens centrally into the membrane chamber. A centric outlet of the connecting channel into the membrane chamber results in a symmetrical structure, which is particularly advantageous with regard to thermally or otherwise induced tensions.

A method according to the invention for manufacturing a metallic pressure measuring cell according to one of the preceding claims comprises the following steps:
  providing a base body comprising a membrane chamber with a predetermined surface contour, a sensor chamber and a connecting channel between the membrane chamber and the sensor chamber,
  providing a metallic membrane comprising at least one surface structure which, in a plan view, at least overlaps an outer contour of an inlet area of the connecting channel into the membrane chamber,
  attaching the metallic membrane to the base body,
  molding of the surface contour of the base body onto the membrane and
  filling of at least membrane chamber, sensor chamber and connecting channel with a pressure transmitting medium.

In that the metallic membrane comprises at least one surface structure which, in a plan view, at least overlaps an outer contour of an inlet area of the connecting channel into the membrane chamber, it is achieved that an outlet of the connecting channel is not sealed when the surface contour of the base body is molded. This ensures that the membrane chamber can be filled with pressure transmitting medium.

Since the surface structure of the membrane is introduced into a surface of the membrane facing the base body, the surface structure is introduced into the membrane before it is bonded to the main body.

In this regard, the surface structure preferably comprises at least one channel that is introduced into the membrane. In particular, such a channel can be introduced into the membrane by a machining process, especially by milling, turning or engraving. For example, the at least one channel can already be introduced into the membrane during its manufacture.

As an alternative to a machining process, the at least one channel can be introduced into the membrane by a remodeling process, in particular by stamping. This can in particular be advantageous if the membrane is obtained as a purchased part, or if for other reasons it is not possible to intervene in the manufacturing process of the membrane. This is particularly advantageous if subsequent machining of the membrane, which typically has a thickness of between 0.01 mm and 0.2 mm, is not possible due to manufacturing reasons.

In one embodiment form, the membrane is welded to the base body. The membrane can be welded to the base body by laser welding or resistance welding, for example.

Additionally or alternatively, the surface structure can be produced by roughening, in particular sandblasting and/or laser machining. A roughened surface prevents a sealing effect caused by the membrane when molding the surface contour of the base body. This can be used to ensure filling of the membrane chamber in addition to channels or as an alternative.

Preferred embodiments, features and characteristics of the proposed field device correspond to those of the proposed method and vice versa.

Advantageous configurations and variants of the invention emerge from the subclaims and the following description. The features listed individually in the subclaims can be combined with one another in any technically sensible manner, as well as with the features explained in more detail in the following description, and can constitute other advantageous variants of the invention.

Figure 2:
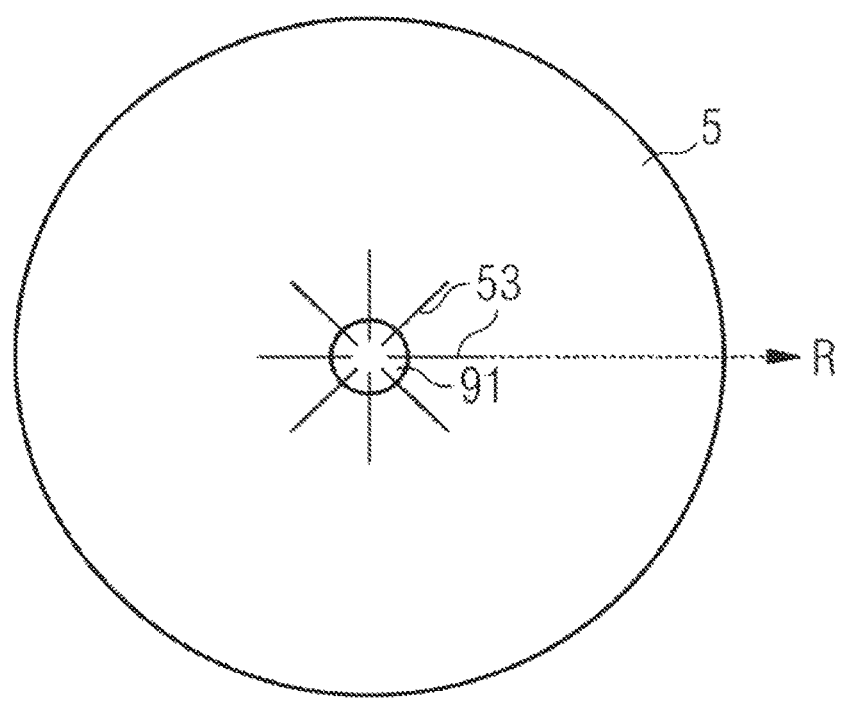
Figure 3:
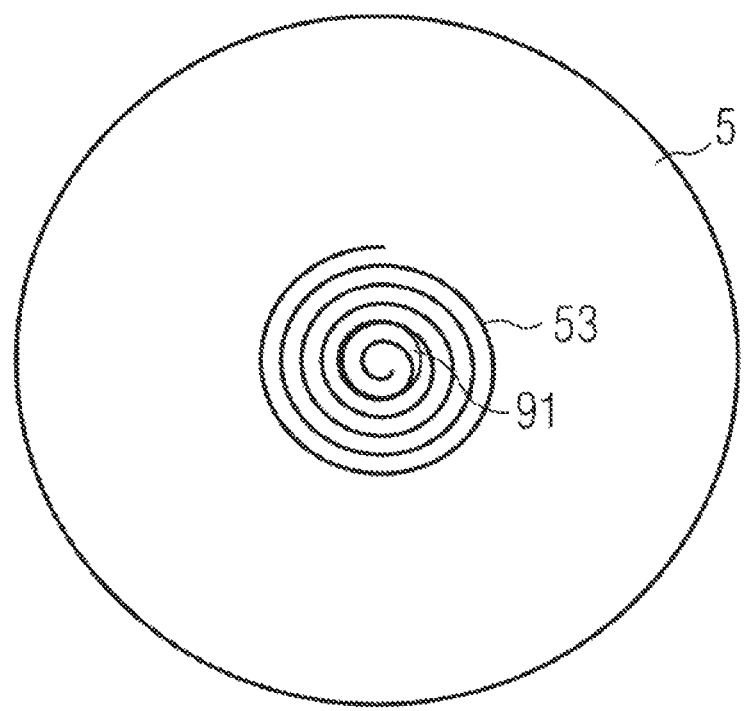
Figure 4:
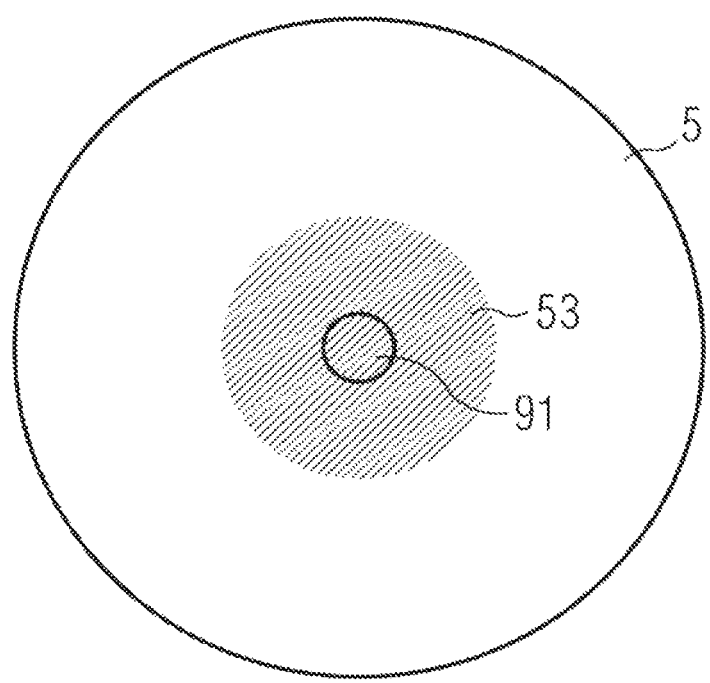
Figure 5:
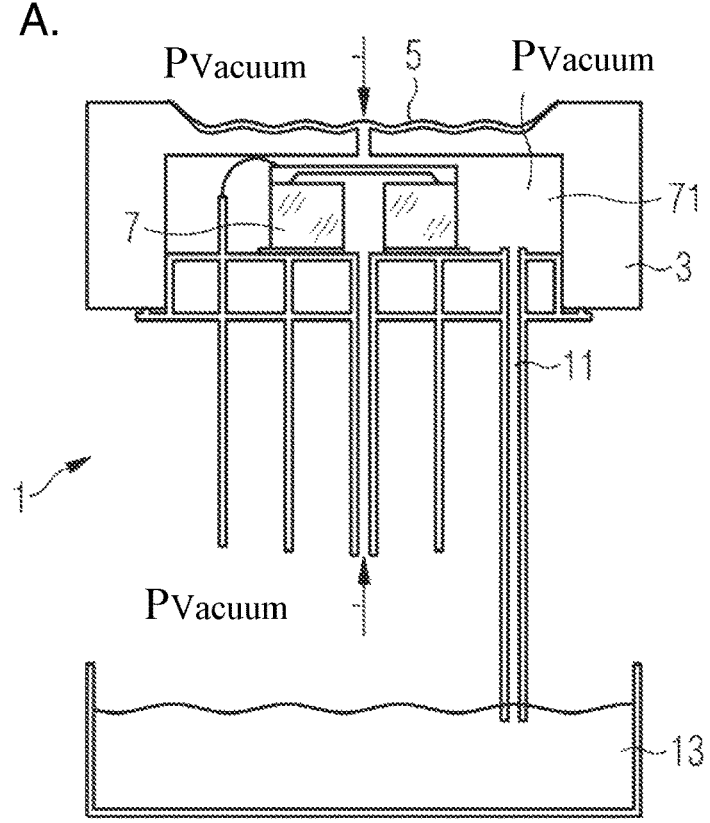
Figure 5:
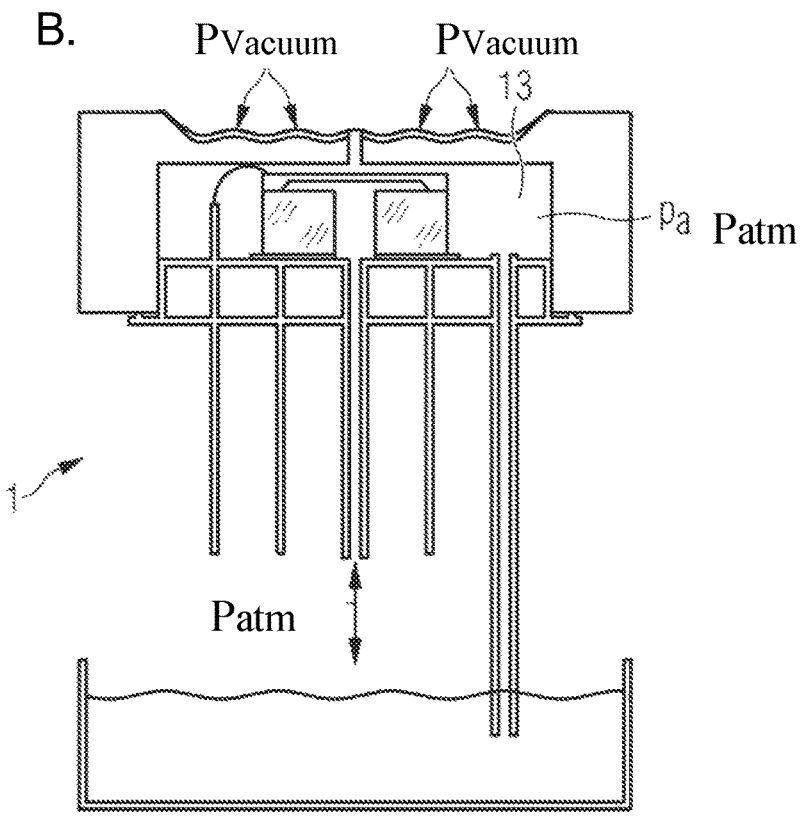

The present invention is explained in further detail below using exemplary embodiments with reference to the attached figures. The following are shown:

FIG. 1 a metallic pressure measuring cell according to the present application, FIG. 2 a first exemplary embodiment of a membrane according to the present application, FIG. 3 a second exemplary embodiment of a membrane according to the present application, FIG. 4 a third exemplary embodiment of a membrane according to the present application, and FIG. 5 a schematic representation of two steps of filling the pressure measuring cell with a pressure transmitting medium.

In the figures—unless otherwise stated—the same reference numerals refer to the same or corresponding components having the same function.

FIG. 1 shows a cross-section of an embodiment of a metallic pressure measuring cell 1 according to the present application.

The pressure measuring cell 1 essentially comprises a metallic base body 3, a metallic membrane 5 arranged at the front of the base body 3 in the axial direction A, and a pressure sensor 7 arranged in a sensor chamber 71 formed in the base body 3.

The sensor chamber 71 is fluidly connected via a connecting channel 9 to a membrane chamber 51 formed between the base body 3 and the membrane 5.

The sensor chamber 71 is closed in the rear direction by a sealing element 80, wherein the sealing element 80 comprises a plurality of cable bushings. The pressure sensor 7 is arranged in the sensor chamber 71. The pressure sensor 7 has a sensor chip 73 as a pressure-sensitive element, which is arranged on the sealing element 80 via a sensor carrier 75.

On the front side, the sensor chip 73 is contacted by a front contact 77 and on the rear side by a rear contact 79, each of which passes through one of the passages through the sealing element 80. A rear part of a membrane of the sensor chip 73 can be subjected to either an ambient pressure or a reference pressure via a pressure equalization line 72, which is also led through the sealing element 80 to the rear side of the sensor chip 73, or the cavity located behind the sensor chip 73 can be evacuated so that an absolute pressure (reference pressure is the vacuum) can be measured.

In the embodiment shown in FIG. 1, the sealing element 80 also comprises an inlet 11 with a tube section arranged thereon, via which the sensor chamber 71, the connecting channel 9 and the membrane chamber 51 can be filled with a pressure transmitting medium, for example a synthetic oil. In the illustration of FIG. 1, however, this pressure transmitting medium 13 has not yet been introduced for the sake of clarity.

In the present embodiment, the membrane 5 is connected to the base body 3 by a circumferential joint 57, in this case a weld. In the present cross-sectional view, the membrane 5 comprises an undulating surface contour corresponding to a surface contour of a wall of the base body 3 facing the membrane 5. This undulating surface contour 55 ensures that the membrane 5 is flexible in the axial direction A, whereas the greatest possible rigidity is achieved in the radial direction R.

The surface contour 55 of the membrane 5 is transferred from the base body 3 to the membrane 5 during the manufacture of the pressure measuring cell 1. For this purpose, the membrane 5 is pressurized from the front after it has been attached to the base body 3, such that it is molded into the membrane bed formed by the base body 3.

FIG. 2 shows a first embodiment of a membrane 5 as it can be used in a pressure measuring cell 1 according to FIG. 1.

The membrane 5 is shown in FIG. 2 in a plan view from below, i.e. looking in the axial direction and from the base body 3 of the pressure measuring cell 1.

For illustration purposes, an inlet area 91 with which the connecting channel 9 enters the membrane chamber 51 through the base body 3 is shown in the center of the membrane 5.

This inlet area 91 also deforms onto the membrane 5 when pressure is applied to the membrane 5 to mold the surface contour of the base body 3, so that this entry requirement 91 or its outer contour can be clearly seen on the membrane 5. For the sake of clarity, the undulating surface contour 55 of the membrane 5, as transferred to the membrane 5 by the deformation of the surface contour of the base body 3, is not shown in FIG. 2.

To ensure that the membrane chamber 51 is filled with pressure transmitting medium 13, the membrane 5 in the embodiment shown in FIG. 2 comprises a surface structure 53 in the form of channels. In the present embodiment, the membrane 5 comprises eight channels 53 running in the radial direction R and each arranged at an angle of 45° to one another, each of which intersects the outer contour of the inlet area 91 but is dimensioned such that the individual channels 53 do not intersect one another.

The channels 53 are dimensioned to extend outwardly in the radial direction R about one-third of a radius r of the membrane 5.

The channels 53 are introduced into a surface of the membrane 5 before it is connected to the base body 3 of the pressure measuring cell 1. During the deformation of the membrane bed, the channels 53 previously formed in the membrane surface remain intact, so that subsequently, when the pressure measuring cell 1 is filled with the pressure transmitting medium 13, the latter can flow through the channels 53 into the membrane chamber 51 and safely fill it.

FIG. 3 shows a second exemplary embodiment of a membrane 5 according to the present application.

The membrane 5 shown in FIG. 3 can also be used in a pressure measuring cell 1, as exemplified in FIG. 1. In contrast to the embodiment example according to FIG. 2, in the present embodiment example the surface structure 53 of the membrane 5 is formed by a single, spirally running channel. In the plan view shown from below, the channel 53 spirals outward starting from a point located within the inlet area 91 of the connecting channel. Due to the spiral design of the channel 53, the surface structure 53 approximates and overlaps the surface contour 55 of the membrane 5, so that the channel 53 thus formed has only a minor influence on the flexibility of the membrane 5 in the axial direction and the rigidity in the radial direction.

FIG. 4 shows a third embodiment of a membrane 5 according to the present application in a plan view from below.

As with the membranes shown in FIGS. 2 and 3, the membrane shown in FIG. 4 can also be used in the pressure measuring cell 1 shown in FIG. 1. In the embodiment example shown in FIG. 4, the surface structure 53 of the membrane 5 is produced by roughening the membrane surface in the area of the displayed crosshatched area. The surface of the membrane 5 is significantly increased in this area by sandblasting compared to the original surface accuracy of the membrane 5, ensuring that pressure transmitting medium 13 enters the membrane chamber 51 when the pressure measuring cell 1 is filled.

It is worth noting at this point that roughening the surface of the membrane 5 can also be carried out in addition to introducing channels, as described in connection with FIGS. 2 and 3.

FIG. 5 shows in a schematic representation two steps of the manufacturing process of the pressure measuring cell 1 according to FIG. 1, whereby the filling of the pressure measuring cell 1 with the pressure transmitting medium 13 is shown in the two partial representations of FIG. 5.

In a first step of a method for manufacturing a metallic pressure measuring cell 1 according to the present application, a metallic base body with a membrane, with a predetermined surface contour, a sensor chamber 71 and a connecting channel 9 between the membrane chamber 51 and the sensor chamber 71 is provided. Furthermore, a metallic membrane 5 is provided which comprises at least one surface structure 53 which, in a plan view, at least overlaps an outer contour of the inlet area 91 of the connecting channel 9 into the membrane chamber 51. In the next step, the metallic membrane 5 is attached to the base body 3 and, in a further step, a surface contour of the base body 3 is molded onto the membrane. In a further step, the pressure sensor 7 is arranged in the sensor chamber 71 and this is closed at the rear side by means of a sealing element 80. In a final step, the membrane chamber, the sensor chamber and the connecting channel are filled with the pressure transmitting medium 13. This step is illustrated in FIGS. 5a) and 5b).

As shown in FIG. 5a), in a first sub-step, the entire sensor 1 is evacuated in a vacuum chamber, resulting in a vacuum in the sensor chamber 71, in the membrane chamber 51 and also in the surroundings of the pressure measuring cell 1. As soon as the pressure measuring cell 1 has been evacuated accordingly, the pipe in connection with the inlet 11 is immersed in a container with pressure transmitting medium 13 and the ambient pressure of the pressure measuring cell 1 is regulated back to normal pressure. The negative pressure in the sensor chamber 71, the membrane chamber 51 and the connecting channel 9 now draws the pressure transmitting medium 13 into the chambers 51, 71 of the pressure measuring cell 1 so that the chambers 51, 71 are completely filled with pressure transmitting medium 13. Finally, the inlet 11 can be closed, thus hermetically sealing the pressure measuring cell 1. Due to the previously described surface structure 53 of the membrane 5, the cavities of the membrane chamber 51 shown in FIG. 5b) are also safely filled with pressure transmitting medium 13, whereby the pressure measuring cell 1 is completely filled with the pressure transmitting medium 13 without any inclusions.

LIST OF REFERENCE NUMERALS

1 Pressure measuring cell
3 Base body
5 Membrane
7 Pressure sensor
9 Connecting channel
11 Inlet
13 Pressure transmitting medium
51 Membrane chamber
53 Surface structure/channel
55 Surface contour
57 Connection
71 Sensor chamber
72 Pressure equalization
73 Sensor chip
75 Sensor carrier
77 Front contact
79 Rear contact
80 Sealing element
91 Inlet area
A Axial direction
R Radial direction
r radius

We claim:

1. A metallic pressure measuring cell having a base body, a metallic membrane situated on the base body, wherein a membrane chamber is formed between the membrane and the base body, a pressure sensor situated in a sensor chamber of the base body, wherein a connecting channel is formed between the membrane chamber and the sensor chamber and the chambers are filled with a pressure transmitting medium for transmitting a pressure acting on the membrane, wherein the membrane comprises a surface structure, which, in a plan view, at least overlaps an outer contour of an inlet area of the connecting channel into the membrane chamber, so that the sealing of an inlet opening of the connecting channel into the diaphragm is prevented.

2. The metallic pressure measuring cell of claim 1, wherein the membrane comprises at least one channel which, in a plan view, overlaps at least once the outer contour of the inlet area of the connecting channel into the membrane chamber.

3. Metallic pressure measuring cell of claim 2, wherein the at least one channel is designed to run at least in sections in the radial direction.

4. The metallic pressure measuring cell of claim 2, wherein the at least one channel, in plan view of the membrane, is spiral-shaped at least in sections.

5. The metallic pressure measuring cell of claim 2, wherein the at least one channel is formed starting from a center point of the membrane in plan view up to at least ⅓ of a radius of the membrane.

6. The metallic pressure measuring cell of claim 2, wherein the membrane comprises at least 2 channels.

7. The metallic pressure measuring cell of claim 1, wherein the membrane comprises, in a cross-sectional view, a surface contour corresponding to a wall of the base body directly opposite to the membrane.

8. Metallic pressure measuring cell of claim 7, wherein the surface contour comprises a cosine-shaped profile.

9. The metallic pressure measuring cell of claim 1, wherein the surface of the membrane is roughened at least in sections.

10. The metallic pressure measuring cell of claim 1, wherein the pressure sensor is designed as a piezo sensor.

11. The metallic pressure measuring cell of claim 1, wherein the connecting channel opens centrally into the membrane chamber.

12. A method for manufacturing the metallic pressure measuring cell of claim 1, comprising the following steps:
   providing a base body comprising a membrane chamber with a predetermined surface contour, a sensor chamber and a connecting channel between the membrane chamber and the sensor chamber,
   providing a metallic membrane comprising at least one surface structure which, in a plan view, at least overlaps an outer contour of an inlet area of the connecting channel into the membrane chamber, so that the sealing of an inlet opening of the connecting channel into the diaphragm is prevented,
   attaching the metallic membrane to the base body,
   molding of the surface contour of the base body onto the membrane and
   filling of at least membrane chamber, sensor chamber and connecting channel with a pressure transmitting medium.

13. The method of claim 12, wherein the surface structure comprises at least one channel, which is introduced into the membrane.

14. The method of claim 13, wherein the at least one channel is introduced into the membrane by a machining method, in particular by milling, turning or engraving.

15. The method according to claim 13, wherein the at least one channel is introduced into the membrane by a remodeling process, in particular by stamping.

16. The method of claim 12, characterized in that the membrane is welded to the base body.

17. The method of claim 12, wherein the surface structure is produced at least partially by roughening, in particular sandblasting or laser machining.

* * * * *